US005760518A

United States Patent [19]

Abe et al.

[11] Patent Number: 5,760,518

[45] Date of Patent: Jun. 2, 1998

[54] FLAT-TYPE COMMUTATOR AND METHOD FOR ITS MANUFACTURE

[75] Inventors: Toru Abe, Chigasaki; Yuzuru Yoshida, Yamato; Mitsuhiko Yamaguchi, Fujisawa; Masakazu Suwa, Machida; Shinya Ashimura, Chigasaki, all of Japan

[73] Assignee: Aupac Co., Ltd., Kanagawa, Japan

[21] Appl. No.: 775,693

[22] Filed: Dec. 31, 1996

Related U.S. Application Data

[62] Division of Ser. No. 580,643, Dec. 29, 1995.

[51] Int. Cl.$^{6}$ .......................... H02K 13/04; H01R 39/06

[52] U.S. Cl. .......................... 310/237; 310/233; 310/234; 310/235; 310/237; 29/597

[58] Field of Search .................................... 310/233, 234, 310/235, 237; 29/597

[56] References Cited

U.S. PATENT DOCUMENTS 5,157,299 10/1992 Gerlach .................................. 310/237

FOREIGN PATENT DOCUMENTS 89 07 045 12/1989 Germany .
44 45 759 A1 6/1995 Germany .
7161428 9/1997 Japan .................................... 310/233
571850 10/1977 U.S.S.R. ................................ 310/237
696565 11/1979 U.S.S.R. ................................ 310/236

*Primary Examiner*—Thomas M. Dougherty
*Assistant Examiner*—Karl Imayoshi Tamai
*Attorney, Agent, or Firm*—Armstrong, Westerman, Hattori, McLeland & Naughton

[57] ABSTRACT

There is provided a flat type commutator which secures fixing of carbon (graphite) commutator pieces to both metal plate with terminals attached thereto for connecting winding and electrically insulating support, and which can be manufactured easily and at a low manufacturing cost.

A flat type commutator with the brush slide-contact surface thereof being perpendicular to the axial direction of a rotor, wherein a plurality of commutator pieces 3 mutually isolated by slits 4 are directly fixed to an electrically insulating support 1, and a metal plate 5 for connecting said commutator pieces, each having terminals 6 for connecting windings is fixed on the outer peripheral surface of said each commutator piece 3 which is in parallel with the axial direction of the rotor. In the manufacture of this flat type commutator, there is simutaneously done the formation of the commutator piece 3 and fixing of the commutator piece 3 to the electrically insulating support 1 and the metal plate 5 for connecting the commutator piece.

3 Claims, 2 Drawing Sheets

FLAT-TYPE COMMUTATOR AND METHOD FOR ITS MANUFACTURE

This is a divisional of application Ser. No. 08/580,643 filed Dec. 29, 1995.

BACKGROUND OF THE INVENTION

1. Field of the Invention

The present invention relates to a commutator for use in a small-sized electric motor, and more particularly, to a flat type commutator having a slide-contact surface with a brush which is perpendicular to the axial direction of the rotor and the method of manufacturing the flat-type commutator.

2. Description of Related Art

The commutators of electric motors which are the driving source for anyone of fans used in a poisonous gas atmosphere, feeding pumps for pumping gasoline of deteriorated quality due to acidification, and other implements used in environments that accelerate considerable corrosion and wear, in comparison with those motors which are usually employed in fresh air, are usually made of various materials such as alloys with copper or silver as the principal constituent. However, the current situation is such that copper and silver alloy materials are not satisfactory for their required durability due to unavoidable corrosion and wear as mentioned above. Because copper and silver alloys are unsatisfactory, it is necessary to use less corrosive materials for constituting the commutator. For example, carbon is considered adequate. However, carbon does not have as good of a spreading property as the copper and silver alloy metal materials, with the consequence that it is not feasible to directly attach a hooking part for connecting the motor winding to the commutator piece. Therefore, it becomes indispensable that the hooking part for connecting the motor winding is separately made of a metal material, and then the hooking part is connected to the commutator fragments.

Japanese patent application "KOHYO" publication No. 5-502974 teaches that the flat-type commutator can be constructed by integral connection of the above-mentioned metal hook and carbon commutator fragments. A metal disc, with the hooking parts being radially provided to the slide-contact surface side of the brush of an electrically insulating support, on its periphery and for the number corresponding to the commutator fragments, is inserted simultaneously with mold-forming of the electrically insulating support. Then, a graphite commutator member, having a joining surface which has been plated in advance, is soldered or welded. Finally, slits are formed in the graphite commutator member, metal disc, and a part of the electrically insulating support, to thereby produce a plurality of mutually insulated commutator pieces. More particularly, as shown in FIG. 6 of the accompanying drawing, a metal plate 15 with a hook is fixedly placed over a graphite commutator piece 13 on an electrically insulating support 11 which constitutes the base for the flat-type commutator.

Such a flat-type commutator is inconvenient, as well as expensive to manufacture, because the plating work has to be done in advance on the joining surface of the commutator member made of graphite with the metal disc hook thereon. Also, depending on the plating conditions, unfavorable influences might occur to the fixing force of the graphite commutator pieces due to the soldering thereof. Further, a swelling phenomenon could take place in the graphite shaped product that comes into contact with gasoline, especially if the gasoline is of a deteriorated quality. Because of this phenomenon, the fixing force between the plated layer and the graphite shaped product becomes unavoidably weakened.

Use of metals such as copper, etc. for the plating work, not only decreases the fixing force between the graphite commutator pieces and the metal plate with a hook, but also decreases the electrical conductivity of the metal plate. A consequence of the decrease in electrical conductivity is that the commutator no longer fulfills its function. For improving durability of the commutator, it might be envisaged to increase the thickness of the commutator pieces in the pressing direction of the commutator brush. However, in so far as the primary purpose of the flat-type commutator resides in miniaturization of the motor, an increase in the thickness of the commutator piece is unjustifiable.

SUMMARY OF THE INVENTION

In view of the above-described problems in the conventional flat-type commutator, it is a primary object of the present invention to provide a flat-type commutator, in which the commutator pieces made of carbon (i.e., graphite), are securely fixed with respect to the metal plate with a hook and the electrically insulating support so as to provide the commutator pieces with a long service life against wear and also provide the commutator pieces with easy and low cost manufacture.

With a view to attaining the above-mentioned object of the present invention, a flat-type commutator is provided having a construction in which the slide-contact surface of the commutator brush is perpendicular to the axial direction of the axis of the rotor, the rotor shaft and the rotor shaft fixing hole. Furthermore, a plurality of commutator pieces, with each commutator piece being insulated from an adjacent commutator piece by means of a slit, are directly fixed to the electrically insulated support. A metal plate, for connecting the commutator pieces, each having a terminal to which the motor winding is attached, is fixed on the outer peripheral surface of each commutator piece. The metal plate is in parallel with the axial direction of the axis of the rotor, rotor shaft, and rotor shaft fitting hole.

In accordance with the present invention, a method for manufacturing the above-mentioned flat-type commutator is provided which comprises: insertion-molding or embedding one end face of a ring member of metal web along the peripheral edge of the electrically insulating support to a slide-contact surface side of the commutator brush; charging the commutator material, consisting principally of graphite, into a recessed portion formed by the electrically insulating support and the ring member made of metal web, which is assembled onto the electrically insulating support; effecting pressed powder shaping and heating; and forming slits in the surface of the commutator member, once solidified, for insulation. The ring member, made of metal web, is placed around the outer periphery of the commutator member, and an upper portion of the outer periphery of the electrically insulating support at a face of the electrically insulating support to the side of the commutator member. The slits formed in the surface of the commutator member split the commutator member into a plurality of commutator fragments or pieces.

The foregoing objects and other objects, as well as the specific construction of the flat-type commutator according to the present invention, and the method of its manufacture, will become more apparent and understandable from the following detailed description thereof, when read in conjunction with the accompanying drawing.

BRIEF DESCRIPTION OF THE DRAWING FIGURES

DETAILED DESCRIPTION OF THE PREFERRED EMBODIMENT

The above-mentioned annular or ring member 5A of metal web is made by insertion-molding or embedding a hooked end of the annular or ring member 5A into a not yet solidified electrically insulating support 1, so as to be shape-connected to the electrically insulating support 1. The commutator pieces 3 are made of a material which consists principally of graphite. It is also appropriate to effect the pressed powder shaping and heating of the material for the commutator pieces with the commutator piece fixing surface 1B of the electrically insulating support being an irregular surface having a plurality of convexities and concavities or a multitude of grooves therein.

Both the electrically insulating support 1 and the graphite commutator pieces 3 are directly and rigidly connected, while the commutator piece connecting metal plate 5 with the terminals 6 for connecting the windings are fixed onto the electrically insulating support 1. When shaping the graphite commutator pieces 3, the recess C formed by the electrically insulating support 1 and the annular or ring member 5A of metal web, which was shaped by insertion-molding or embedding along the peripheral edge of the electrically insulating support 1 at the side of its slide-contact surface of the commutator brush, constitute the metal mold for shaping the commutator pieces 3.

In the following, the construction of the flat-type commutator according to the present invention will be explained in detail in reference to the accompanying drawing.

Figure 1:
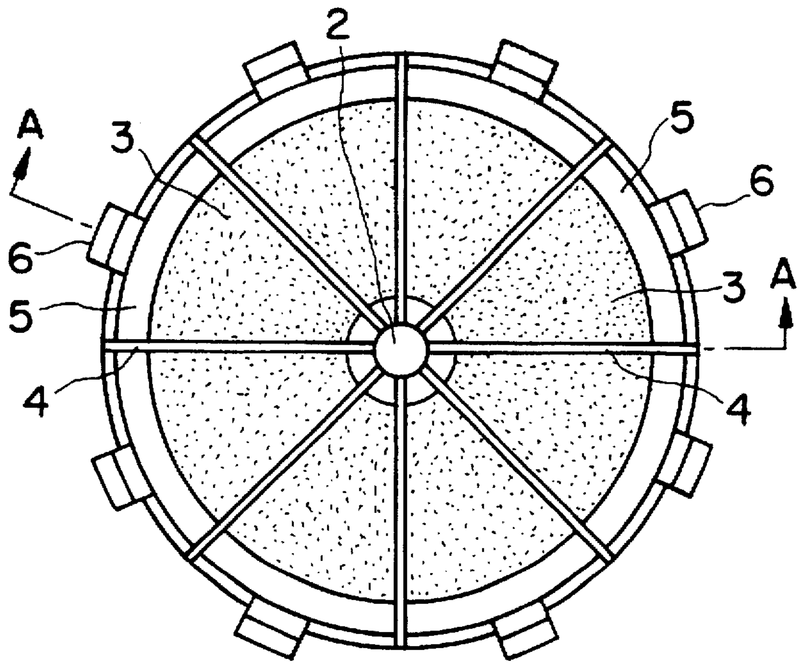
FIG. 1 is a plan view showing the flat-type commutator according to the present invention.
Figure 2:
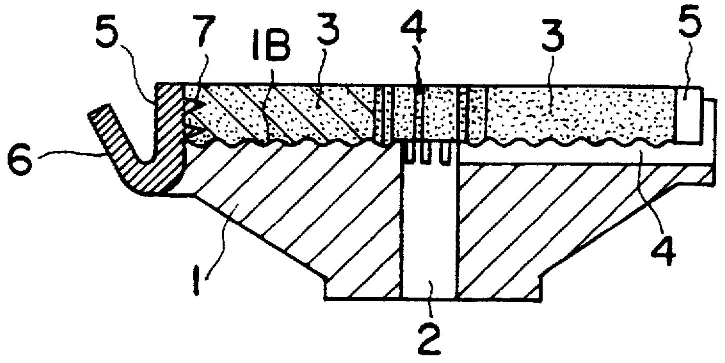
FIG. 2 is a longitudinal cross-sectional view of the commutator, taken along the line A—A in FIG. 1.

FIGS. 1 and 2 are a plan view and a longitudinal cross-sectional view taken along the line A—A in FIG. 1, respectively. A top-shaped electrically insulating support 1 is made of a rigid synthetic resin. A rotor shaft fitting hole 2 is formed at the center of the electrically insulating support 1 for receiving therein the rotor shaft having a rotational axis (not shown in the drawing) of the motor. A plurality of commutator pieces 3, each being sector-shaped, are directly fixed onto the surface of the electrically insulating support 1 to the slide-contact surface side of the brush (i.e., onto the surface perpendicular to the direction of the above-mentioned rotor shaft fitting hole 2). The surface opposite to the fixing side is the slide-contact surface of the brush. Each commutator piece 3 is made of a material consisting principally of graphite which is subjected to pressed powder shaping and heat-treatment to obtain the commutator. The electrically insulating support 1 has a commutator piece fixing surface 1B which is an irregular surface due to a plurality of minute convexities and concavities or a multitude of grooves to increase the area of the electrically insulating support 1 to be fixed to the commutator pieces 3.

The adjacent commutator pieces 3, 3 are electrically insulated from each other. Slits 4 are formed by being incised into the commutator member to the electrically insulating support 1 for separating the commutator member into commutator pieces. Further, a metal plate 5, for connecting the commutator pieces, is fixed onto each individual outer peripheral surface of each of the above-mentioned commutator pieces 3. The outer peripheral surface of each commutator piece 3 is in parallel with the rotor shaft fitting hole 2. At the same time, a part of the commutator pieces connecting metal plate 5 is embedded in the electrically insulating support 1. A terminal 6 is attached to the commutator pieces connecting metal plate 5, and the winding of the rotor is connected to this terminal 6. This terminal 6 is made by press-punching and then bending a metal material integral with the commutator piece connecting metal plate 5.

Figure 3:
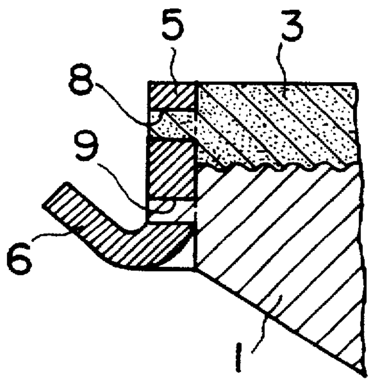
FIG. 3 is a longitudinal cross-sectional view showing the connected member among the electrically insulating support, the commutator piece, and the metal plate for connecting the commutator piece.

Small projections 7 are provided on the inner surface of the commutator piece connecting metal plate 5 so as to reinforce the attachment between the commutator pieces 3 and the commutator piece connecting metal plate 5. FIG. 3 illustrates another embodiment of a reinforcing means for fixing the commutator piece 3 to the commutator piece connecting metal plate 5. A small hole 8 is formed in the commutator piece connecting metal plate 5. The shaping material for the commutator piece 3 is inserted into the hole 8 and allowed to harden. At the same time, the shaping material of the electrically insulating support 1 is caused to penetrate into another small hole 9 for the commutator piece connecting metal plate 5 to thereby reinforce the connection between the commutator piece 3 an the electrically insulating support 1. Thus, the commutator piece connecting metal plate 5 is form-connected to the electrically insulating support 1. In other words, the electrically insulating support 1 is firmly connected to the commutator piece connecting metal plate 5, when the electrically insulating support 1 is made of synthetic resin, without using connecting means such as an adhesive agent, a screw, a bolt, a rivet or caulking. The commutator piece 3 and the commutator piece connecting metal plate 5 can also be fixed by soldering or with an electrically conductive adhesive agent, provided that the required fixing force can be obtained.

Figure 4:
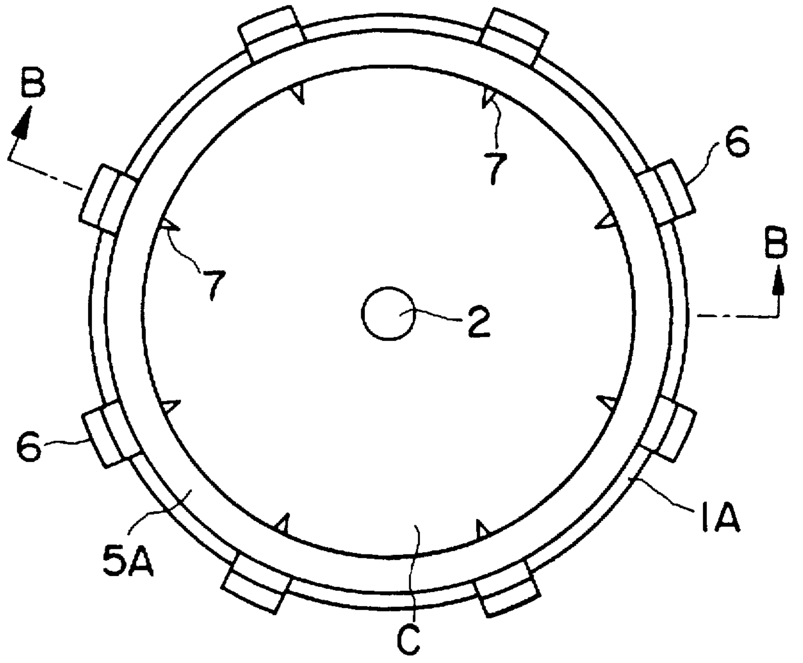
FIG. 4 is a plan view showing the method for manufacturing the flat-type commutator according to the present invention.
Figure 5:
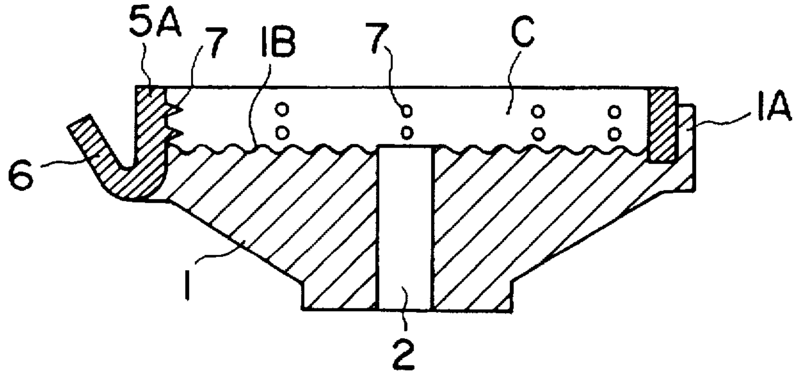
FIG. 5 is a longitudinal cross-sectional view taken along the line B—B in FIG. 4.
Figure 6:
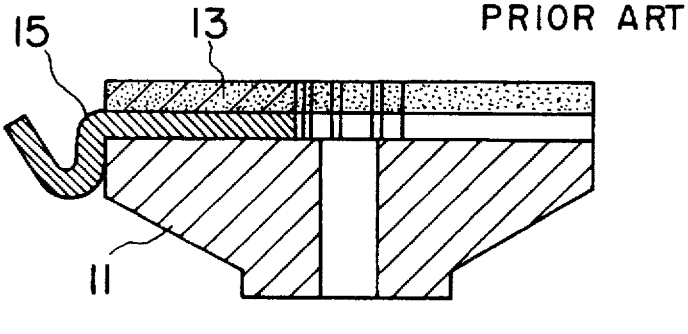
FIG. 6 PRIOR ART
FIG. 6 is a longitudinal cross-sectional view of a conventional flat-type commutator.

In the following, explanations will be made as to the method of manufacturing the flat-type commutator according to the present invention. The electrically insulating support 1 is obtained by mold-shaping in the same manner as has so far been done. During this mold-shaping, an annular member 5A of metal web is subjected to insertion-molding or embedding along the peripheral edge of the electrically insulating support 1 to its brush slide-contact surface in such a manner that one end face of the annular member 5A may be embedded in the electrically insulating support 1, as shown in FIGS. 4 and 5. As in the illustrated embodiment, it is preferable that a part 1A of the material constituting the electrically insulating support 1 be allowed to partially encompass the outer periphery of the annular or ring member 5A of metal web. The terminal 6 is provided in advance at a predetermined position on the outer periphery of the annular or ring member 5A of metal web.

Subsequently, material for the commutator, with graphite as the principal constituent thereof, is charged into a shallow circular recess C formed at the center of the electrically insulating support 1. The recess C has been formed by insertion-molding or embedding of the annular or ring member 5A of metal web on and around the electrically insulating support 1, followed by pressed powder shaping and heating. That is to say, both electrically insulating support 1 and the annular or ring member 5A of metal web are utilized as the mold for the pressed mold for powder shaping, the annular ring member, 5A of metal web providing the sides of the commutator member and the top of the electrically insulating support 1 providing the mold for the bottom of the commutator member.

After this slits 4 are incised in the radial direction as shown in FIGS. 1 and 2, in the surfaces of the commutator member, once solidified, and the annular or ring member 5A of metal web disposed on the outer periphery of the commutator member, and the upper portion of the electrically insulating support 1 to the side of the commutator member, thereby dividing the commutator member into a plurality of mutually insulated commutator fragments or pieces 3. By carrying out the above-mentioned process steps, the flat-type commutator can be obtained, in which the above-mentioned three parts, namely the electrically insulating support 1, the commutator pieces 3 directly fixed onto the support 1, and the commutator piece connecting metal plate 5, are integrally joined.

As has been described in the foregoing, the flat-type commutator according to the present invention has the commutator pieces 3 directly fixed to the electrically insulating support 1, so that there is no instability factor in the fixing force between the commutator pieces 3 and the electrically insulating support 1, when compared to the fixing force obtained by the conventional plating and fixing methods. Also, when a motor provided with this flat-type commutator is used in liquid such as gasoline, and others, the electrical and mechanical connection between the electrically insulating support 1 of the commutator pieces 3 and the commutator piece connecting metal plate 5 is more reinforced, because the outer peripheral surface of the flat-type commutator is supported by the commutator piece connecting metal plate 5 to protect against swelling of the commutator pieces 3 obtained by the pressed powder-shaping. The above-mentioned commutator piece connecting metal plate 5 functions to securely retain the commutator pieces 3 against the centrifugal force which occurs during revolution of the commutator. Moreover, since the thickness of the commutator can be increased due to the absence of the metal plate between the electrically insulating support 1 and the commutator pieces 3 as in conventional commutators, the effect can be realized such that sufficient dimensions for possible wear of the commutator can be obtained to prolong the service life of the commutator.

Also, according to the method of manufacture of the present invention, the shaping of the commutator pieces 3 and the fixing of the commutator pieces 3 to both the electrically insulating support 1 and the commutator piece connecting metal plate 5 are done simultaneously. Hence, there is no necessity for a plating and gluing step as is necessary with a conventional commutator. Thus, considerable reduction in the number of process steps and the amount of manpower necessary can be attained.

Although, in the foregoing, the present invention has been described with reference to the particular embodiments thereof, it should be understood that the invention is not limited to these embodiments alone, but any changes and modifications may be made within the spirit and scope of the invention as recited in the appended claims.

What is claimed is:

1. A flat type commutator comprising:

an electrically insulating support including a rotor shaft fitting hole and a commutator piece fixing surface extending in a perpendicular direction from a rotational axis of said rotor shaft fitting hole, said commutator piece fixing surface being an irregular surface having a plurality of convexities and concavities;

a plurality of commutator pieces each having a fixing surface which is an irregular surface having a plurality of convexities and concavities that correspondingly mate in a male/female manner with said plurality of convexities and concavities on said electrically insulating support to create a fixing area over which said commutator pieces are directly and rigidly connected to said electrically insulating support, each commutator piece of said plurality of commutator pieces having an outer, radial peripheral surface and a brush slide-contact surface which is perpendicular to an axial direction of said rotor shaft fitting hole;

a plurality of metal plates each having an inner, radial surface with at least one small projection extending radially inward from said inner, radial surface and an outer, radial peripheral surface with a terminal for connecting windings extending from said outer, radial peripheral surface;

wherein said inner, radial peripheral surface of one of said plurality of metal plates respectively engage said outer, radial peripheral surface of one of said plurality of commutator pieces having one of said plurality of metal plates connected to said outer, radial peripheral surface, by said at least one small projection; and wherein each said commutator piece of said plurality of commutator pieces is made of graphite.

2. The flat type commutator according to claim 1, wherein said electrically insulating support is formed of a rigid synthetic resin.

3. The flat type commutator according to claim 1, wherein said electrically insulating support has a plurality of radially outwardly projecting extensions which project outwardly from an outer peripheral surface of said electrically insulating support into small holes in each metal plate of said plurality of metal plates.

* * * * *